US012445809B2

(12) United States Patent
Das et al.

(10) Patent No.: US 12,445,809 B2
(45) Date of Patent: Oct. 14, 2025

(54) GROUP IDENTITIES IN A COMMUNICATION SYSTEM

(71) Applicant: NOKIA TECHNOLOGIES OY, Espoo (FI)

(72) Inventors: Prashanti Das, Bangalore (IN); Bruno Landais, Pleumeur-Bodou (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 612 days.

(21) Appl. No.: 17/710,838

(22) Filed: Mar. 31, 2022

(65) Prior Publication Data

US 2022/0322053 A1    Oct. 6, 2022

(30) Foreign Application Priority Data

Apr. 3, 2021   (IN) .............................. 202141015857

(51) Int. Cl.
*H04W 4/08*    (2009.01)
(52) U.S. Cl.
CPC .................................... *H04W 4/08* (2013.01)
(58) Field of Classification Search
CPC ............ H04L 65/1016; H04L 65/1069; H04L 65/1104; H04L 65/1073; H04L 67/51; H04L 12/1407; H04L 67/02; H04L 61/4588; H04L 65/4061; H04L 65/1063; H04L 67/303; H04L 69/24; H04L 61/35; H04L 63/0807; H04L 65/80; H04L 67/306; H04L 12/1432; H04L 12/185; H04L 12/4641; H04W 88/06; H04W 4/08; H04W 60/00; H04W 80/10; H04W 12/08;

(Continued)

(56) References Cited

U.S. PATENT DOCUMENTS 11,431,746 B1 *   8/2022   Shaw ...................... H04L 61/00
2016/0007316 A1 * 1/2016   Vaidya ................ H04W 64/003
                                                                   370/312

(Continued)

FOREIGN PATENT DOCUMENTS

| CN | 108683690 A | 10/2018 |
| CN | 110535648 A | 12/2019 |
| EP | 2173115 A1 | 4/2010 |

OTHER PUBLICATIONS

R. Fielding et al., "Hypertext Transfer Protocol (HTTP/1.1): Message Syntax and Routing," Internet Engineering Task Force (IETF), RFC 7230, Jun. 2014.

(Continued)

*Primary Examiner* — Golam Sorowar
(74) *Attorney, Agent, or Firm* — SQUIRE PATTON BOGGS (US) LLP (57) ABSTRACT

Apparatuses and methods for providing services in a communication system are disclosed. A request for a service provided by a service function entity in a network system is received, wherein the request indicates an identity of a user for which the service is requested. An identity of a group of service function entities capable of serving the user and determined based on the identity of the user is then provided, and an indication of the determined identity of the group is sent in the response for subsequent use by the sender of the request and/or at least one other entity involved in requests for services associated with the user.

14 Claims, 4 Drawing Sheets

(58) Field of Classification Search
CPC ....... H04W 4/06; H04W 12/06; H04W 76/11;
H04W 8/08; H04W 76/40; H04W 4/24;
H04W 68/005; H04W 8/183; H04W 8/20;
H04W 8/22; H04W 84/042; H04W 48/16;
H04W 76/10; H04W 12/069; H04W 4/10
See application file for complete search history.

(56) References Cited

U.S. PATENT DOCUMENTS

| | | | | |
|---|---|---|---|---|
| 2017/0041752 | A1* | 2/2017 | Baek | H04W 76/40 |
| 2020/0336864 | A1* | 10/2020 | Huang | H04W 76/11 |
| 2021/0168215 | A1* | 6/2021 | Zong | H04L 67/146 |
| 2021/0227625 | A1* | 7/2021 | Wang | H04W 76/11 |
| 2022/0070648 | A1* | 3/2022 | Krishan | H04W 8/005 |
| 2022/0182822 | A1* | 6/2022 | Ma | H04W 12/06 |
| 2022/0345379 | A1* | 10/2022 | Li | H04L 67/63 |
| 2023/0108178 | A1* | 4/2023 | Xu | H04W 36/0007 370/312 |

OTHER PUBLICATIONS

3GPP TS 23.501 V16.7.0 (Dec. 2020), Technical Specification, 3rd Generation Partnership Project; Technical Specification Group Services and System Aspects; System architecture for the 5G System (5GS); Stage 2 (Release 16), Dec. 2020.
3GPP TS 29.510 V16.6.0 (Dec. 2020), Technical Specification, 3rd Generation Partnership Project; Technical Specification Group Core Network and Terminals; 5G System; Network Function Repository Services; Stage 3 (Release 16), Dec. 2020.
Extended European Search Report dated Sep. 23, 2022, corresponding to European Patent Application No. 22164325.7.

* cited by examiner

GROUP IDENTITIES IN A COMMUNICATION SYSTEM

FIELD

The present disclosure relates to methods, apparatuses and computer program products in a communication system, and more particularly group identities in a communication system.

BACKGROUND

A communication system provides a facility communication between two or more devices such as user terminals, machine-like terminals, base stations and other access points, network entities, service provider entities and/or other devices. A communication system can be provided for example by means of a communication network and one or more compatible devices providing communication channels for carrying information between the communicating entities. Communication devices, for example user devices and other terminal devices can access the communication network via access points. A communication device providing an access point is provided with an appropriate signal receiving and transmitting apparatus for enabling communications. Communication sessions may comprise, for example, communication of data for carrying communications for services such as voice, video, electronic mail (email), text message, multimedia, control data and/or content data and so on. Non-limiting examples of services provided comprise two-way or multi-way calls, data communication, multimedia services and access to a data network system, such as the Internet.

In a mobile or wireless communication system at least a part of a communication session between at least two devices occurs over a wireless or radio link. Examples of wireless systems comprise public land mobile networks (PLMN), satellite-based communication systems and different wireless local networks, for example wireless local area networks (WLAN). A user can access the wider communication system via an access system means of an appropriate communication device or terminal. A communication device of a user may be referred to as user equipment (UE) or user device. A wireless communication device is provided with an appropriate signal receiving and transmitting apparatus for enabling the communications.

The wireless access can be provided by a base station of a radio access system or network. Radio access systems provide local coverage areas and are connected to a larger communication system, known as the core network. The core network comprises a wide variety of entities providing various functionalities and services. Similar functions and/or services may be provided by different entities in separate locations and/or by distributed data processing. At least some of the functions and/or services may be provided by virtual data processing instances. Providing data communications between the accessing devices and the ultimate service providing entities can involve intermediate and otherwise associated entities, processes and functions.

The communication system and associated devices typically operate in accordance with a given standard or specification which sets out what the various entities associated with the system are permitted to do and how that should be achieved. Communication protocols and/or parameters which shall be used for the connection are also typically defined. Examples of communication systems are based on so-called fifth generation (5G) networks. 5G is being standardized by the 3rd Generation Partnership Project (3GPP). The successive versions of the standard are known as Releases (Rel). In a 3GPP 5G standardisation work is ongoing to further develop and improve the features of the communications system.

SUMMARY

In accordance with an aspect there is provided an apparatus comprising at least one processor and at least one memory including a computer program code, the at least one memory and computer program code configured to, with the at least one processor, cause the apparatus at least to: receive a request for a service provided by a service function entity in a network system, wherein the request indicates an identity of a user for which the service is requested, determine an identity of a group of service function entities capable of serving the user and determined based on the identity of the user, and send an indication of the determined group identity in the response for subsequent use by the sender of the request and/or at least one other entity involved in requests for services associated with the same user.

In accordance with an aspect there is provided an apparatus comprising means for receiving a request for a service provided by a service function entity in a network system, wherein the request indicates an identity of a user for which the service is requested; means for determining an identity of a group of service function entities capable of serving the user and determined based on the identity of the user, and means for sending an indication of the determined group identity in the response for subsequent use by the sender of the request and/or at least one other entity involved in requests for services associated with the same user.

In accordance with a more specific aspect the apparatus may be configured to receive the request for the service from a network function entity, send an enquiry to at least one network entity associated with providing the requested service, and send the indication of the determined identity of the group in a response to the network function entity. The network function entity may comprise an access and mobility management function.

The apparatus may comprise a service proxy function configured to determine and send the indication of the identity of the group in response to receiving the request.

In accordance with another aspect there is provided apparatus comprising at least one processor and at least one memory including a computer program code, the at least one memory and computer program code configured to, with the at least one processor, cause the apparatus at least to: send a request for a service provided by a service function entity in a network system, wherein the request indicates an identity of a user for which the service is requested, receive in response an identity of a group of service function entities capable of serving the user and determined based on the indicated identity of the user, and store the indication of the determined identity of the group for subsequent use by the apparatus and/or at least one other entity involved in requests for services associated with the user.

In accordance with another aspect there is provided an apparatus comprising means for sending a request for a service provided by a service function entity in a network system, wherein the request indicates an identity of a user for which the service is requested, means for receiving in response an identity of a group of service function entities capable of serving the user and determined based on the indicated identity of the user, and means for storing the indication of the determined identity of the group for subsequent use by the apparatus and/or at least one other entity involved in requests for services associated with the user.

In accordance with an aspect there is provided a method comprising: receiving a request for a service provided by a service function entity in a network system, wherein the request indicates an identity of a user for which the service is requested, determining an identity of a group of service function entities capable of serving the user and determined based on the identity of the user, and sending an indication of the determined identity of the group in a response for subsequent use by the sender of the request and/or at least one other entity involved in requests for services associated with the user.

The receiving may comprise receiving the request for the service from a network function entity. The determining may comprise sending an enquiry to at least one network entity associated with providing the requested service. The sending of the indication may comprise sending the determined identity of the group to the network function entity.

In accordance with an aspect there is provided a method comprising: sending a request for a service provided by a service function entity in a network system, wherein the request indicates an identity of a user for which the service is requested, receiving in response an identity of a group of service function entities capable of serving the user and determined based on the indicated identity of the user, and storing the indication of the determined identity of the group for subsequent use by the recipient of the response to the request and/or at least one other entity involved in requests for services associated with the user.

In accordance with a specific aspect providing the service comprises indirect communication with a delegated service discovery.

A service request response message may be provided to a user device or a network access management entity receiving a request for the service from a user device.

In accordance with an aspect the indication of the determined group identity is communicated in a header of a service response message. The header may comprise a header configured for use as a 3GPP Service Based Interface (SBI) header. In accordance with a detailed aspect the header is configured as 3gpp-Sbi-Target-Nf-Group-Id" ":" OWS "nfgid=" nfGroupIdvalue. In accordance with another detailed aspect the header is configured as 3gpp-Sbi-Producer-Id="3gpp-Sbi-Producer-Id" ":" OWS "nfinst=" nfInstanceIdvalue [;OWS "nfgid=" nfGroupIdvalue].

The request may comprise a request for services to the user by a provider of at least one of Unified Data Management service, Authentication Server Function, Policy Control Function, Unified Data Repository, Charging Function, or Home Subscriber Service.

Discovery and selection of a service function entity in the network system may be provided based on a mobile subscriber identity and exchange of messages with a Network Function Repository Function. A request for the service may be sent to the selected service function entity. An indication of the identity of the group may be included in a service response.

A service communication proxy can receive the request for the service and send in a service response message the indication of the determined group identity.

The request may comprise a request for Unified Data Management (UDM) service and the group identity may comprise a UDM group identity, wherein a UDM entity is discovered and selected in the network system based on a mobile subscriber identity and exchange of messages with a Network Function Repository Function, a request for the service is sent to the selected UDM entity, and an indication of the UDM group identity is included in a UDM service response.

The group identity may comprise the group identity for at least one of Unified Data Management service, Authentication Server Function, Policy Control Function, Unified Data Repository, Charging Function, or Home Subscriber Service.

The determined identity of the group may be stored for subsequent use. The indication of the determined identity of the group may be forwarded to another entity for subsequent use by the other entity.

Means for implementing the herein disclosed operations and functions can also be provided.

A computer software product embodying at least a part of the herein described functions may also be provided. In accordance with an aspect a computer program comprises instructions for performing at least one of the methods described herein.

BRIEF DESCRIPTION OF DRAWINGS

Some aspects will now be described in further detail, by way of example only, with reference to the following examples and accompanying drawings, in which.

DETAILED DESCRIPTION OF EXAMPLES

The following description gives an exemplifying description of some possibilities and useful background information to practise the invention. Although the specification may refer to "an", "one", or "some" examples or embodiment(s) in several locations of the text, this does not necessarily mean that each reference is made to the same example of embodiment(s), or that a particular feature only applies to a single example or embodiment. Single features of different examples and embodiments may also be combined to provide other embodiments.

Figure 1:
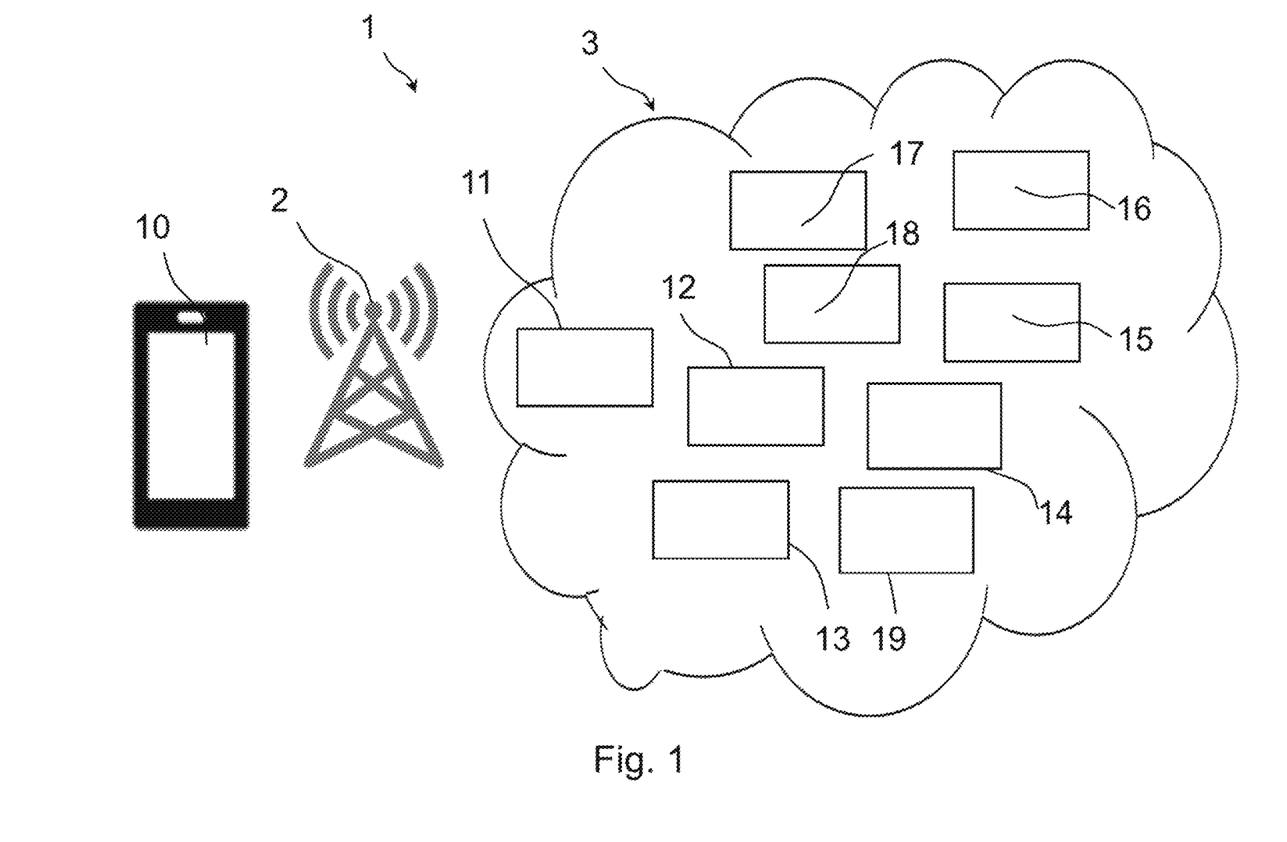
FIG. 1 illustrates a schematic example of a system where the herein disclosed principles can be practiced.

FIG. 1 shows a schematic presentation of system 1 comprising a radio access system 2 and a core network (CN) system shown as cloud 3. A radio access system can comprise one or a plurality of access points. A number of radio access systems can be connected to the core network. An access point can comprise any node that can transmit/receive radio signals (e.g., a TRP, a 3GPP 5G base station such as gNB, eNB, a user device such as a UE and so forth). In FIG. 1 the access point and the radio access system is presented as a base station. An example of wireless access architecture is 3GPP 5G radio access architecture. However, embodiments are not limited to such an architecture. Some examples of options for suitable systems are the universal mobile telecommunications system (UMTS) radio access network (UTRAN or E-UTRAN), long term evolution (LTE), LTE-A (LTE advanced), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs), cellular internet of things (IoT) RAN and Internet Protocol multimedia subsystems (IMS) or any combination and further development thereof.

A communications device 10 is located in the service area of the radio access system 2. The device 10 can thus communicate wirelessly with the access point provided by the system 2. The communications device 10 is an example of a user which can request for one or more services provided by entities of the core network 3. The device is associated with a unique user identity. The user identity may be assigned to the device, to a user of the device or a subscription by a user of the device. In this specification the term user identity is intended to cover any identity that can be associated with and used to identify a device using a service.

The device 10 may be any suitable communications device adapted for wireless communications. A wireless communications device may be provided by any device capable of sending and receiving radio signals. Non-limiting examples comprise a mobile station (MS) (e.g., a mobile device such as a mobile phone or what is known as a 'smart phone'), a computer provided with a wireless interface card or other wireless interface facility (e.g., USB dongle), personal data assistant (PDA) or a tablet provided with wireless communication capabilities, machine-type communications (MTC) devices, Internet of Things (IoT) type communications devices or any combinations of these or the like. The device may be provided as part of another device. The device may receive signals over an air or radio interface via appropriate apparatus for receiving and may transmit signals via appropriate apparatus for transmitting radio signals. The communications can occur via multiple paths. Multiple input multiple output (MIMO) type communications may be provided with multiantenna elements.

The wider communication system (core network) 3 can comprise a 5G core network (5GC) and entities providing one or more Network Functions (NF). The system can comprise one or more data networks (DN). In FIG. 1 blocks 11 to 19 denote various possible network entities. The non-liming and non-exhaustive list of these include an Access and Mobility Management Function (AMF) 11, an Authentication Server Function (AUSF) 13, Network Function Repository Function (NRF) 14, Policy Control Function (PCF) 15, Unified Data Management (UDM) service 16, Unified Data Repository (UDR) 17, Charging Function (CF) 18, and Home Subscriber Service (HSS) 19. Other management, control and application functions such as the Session Management Function (SMF) and the like are also possible. It shall be appreciated that at least some of the entities denoted by blocks 11 to 19 can be provided as virtual data processing instances in virtualized environment.

FIG. 1 shows a service communication proxy (SCP) 12. The proxy can be configured to implement some of the herein disclosed features. For example, according to certain aspects the proxy determines group identities and provides at least one other entity with information about the determined group identities. The group identity information can be provided to the entities within the core network 3. Detailed examples of functionalities of the SCP are described later in this specification.

Figure 2:
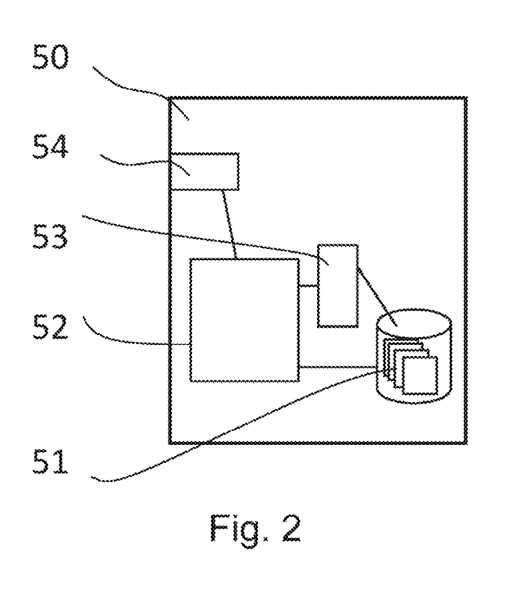
FIG. 2 shows an example of a control apparatus.

Functions of devices such as the access point 2 or the accessing device 10 and any of the network entities 11 to 19 can be provided by a data processing apparatus or in short apparatus. The data processing can be provided by an apparatus comprising means for executing the data processing functions, e.g. at least one processor and at least one memory. FIG. 2 shows an example of a data processing apparatus 50 comprising processor(s) 52, 53, 54 and memory or memories 51. FIG. 2 further shows connections between the elements of the apparatus and an interface for connecting the data processing apparatus to other components of the device. The at least one memory may comprise at least one ROM and/or at least one RAM. The communications device may comprise other possible components for use in software and hardware aided execution of tasks it is designed to perform and implementing the herein described features. The at least one processor can be coupled to the at least one memory. The at least one processor may be configured to execute an appropriate software code to implement one or more of the following aspects. The software code may be stored in the at least one memory, for example in the at least one ROM.

The processing may be distributed between several processors. The processing may be provided by virtual data processing instances such as virtual machines or separated cores (containers) operated on a shared operating system resource. In this specification the term entity covers such virtual data processing instances.

The following describes in more detail certain illustrative examples and non-limiting aspects of operations, configurations and signaling using 3GPP 5G Core Network (5GC) terminology. In 3GPP 5G, Unified Data Management (UDM) group identity (ID) refers to one or more Unified Data Management (UDM) instances managing a specific set of Subscription Permanent Identifiers (SUPIs). An UDM group consists of one or multiple UDM sets. Group ID can be supported based on SUPI for various functions supporting operation in the network system such as Authentication Server Function (AUSF), Charging Function (CHF), Policy Control Function (PCF), Unified Data Repository (UDR) and so on.

Network functions typically have their own group identities. For example, AUSF group ID refers to one or more AUSF instances managing a specific set of SUPIs. An AUSF group can comprise one or multiple AUSF Sets. CHF group ID refers to one or more CHF instances managing a specific set of SUPIs. PCF group ID refers to one or more PCF instances managing a specific set of SUPIs. A PCF group can comprise one or multiple PCF Sets. UDR group ID refers to one or more UDR instances managing a specific set of SUPIs. An UDR group can comprises one or multiple UDR Sets.

Use of services, for example Unified Data Management (UDM) service, can involve a process known as discovery. Discovery can comprise various stages and interaction with different entities. For example, discovery for a UDM service can include two parts. First the UDM group identity is resolved based on the SUPI. Next the UDM entity for the corresponding UDM group identity is discovered. For example, a Network Function Repository Function (NRF) storing a mapping between UDM group IDs and SUPIs may be queried. The UDM instance may also interact with Unified Data Repository (UDR) to resolve the UDM group ID for the SUPI.

A device, for example the user equipment (UE) 10 can register itself with relevant core network function or functions to be able to access and use the desired service available in the system 1. For example, the device may need to register with the Access and Mobility Management Function (AMF) 11. During the registration multiple Network Functions (NF) may need to invoke the UDM service for the specific identity associated with the device. For example, multiple database queries may be needed to locate the UDM group ID corresponding to a target SUPI.

It is noted that UDM is used as an example. Similar group identity concept based on the user identity is defined, for example, for AUSF, PCF, CHF, UDR and HSS network functions and can be defined for any network function in a wireless network. In particular, while the examples described in this document refer to the 5G system, the concepts of this document have a more general reach and can as well be applied to future developments of the wireless system referred to in this document as well as different wireless systems. For Internet Protocol (IP) Multimedia Subsystem (IMS) services, the HSS group ID is based on specific set of MS Private User IDs/IMS Public User IDs (IMPIs/IMPUs). During IMS registration, I-CSCF, S-CSCF and Application Server invoke HSS service.

5G based systems provide a specific interface arrangement for handling the services known as Service Based Interface (SBI). SBI refers to Application Programming Interface (API) based communications. The communications can take place between two Virtualized Network Functions (VNFs) within the 5G Service Based Architecture (SBA). In SBI based arrangements the user of the NF ("Consumer") may use so called Model D (defined in 3GPP TS 23.501 v16.7.0 Annex E where a Service Communication Proxy (SCP) performs selection of the provider of the network function (NF; the "Producer") based on discovery parameters specified in the service request. For discovery of, for example, a UDM/HSS service, the SCP can rely on the NRF to discover the group ID of UDM/HSS instance(s) serving the provided user identity. A possibility for the SCP is to first query the UDR(GroupIDmap) for the UDM/HSS group ID for the provided user identity. Another possibility known as Model C enables indirect communication without delegated discovery where users of discovery can query the NRF. Based on the result of the discovery, the user device can select a network function (NF) set or a specific NF instance of an NF set. The device using the service sends the request to the SCP containing the address of the selected service producer pointing to a NF service instance or a set of NF service instances. In the latter case, the SCP selects an NF service instance. If possible, the SCP interacts with NRF to get selection parameters such as location, capacity, etc. The SCP routes the request to the selected NF service producer instance.

Following Discovery and NF target selection, SCP can proxy the service request towards the selected NF producer. SCP proxies the service response from the NF producer towards the NF consumer. SCP can communicate the selected NF producer instance ID to the NF consumers via 3gpp-Sbi-Producer-Id header in the service response. NF consumers can then query the producer's NF profile from the NRF and in the group ID in response. This may not always be an efficient way of operation. For example, such querying can cause delay in the device registration or IMS registration. Problems may also be caused because such behaviour can be something the device requesting for a network function service is not expecting when delegating selection of the network function service producer to a SCP.

Figure 3:
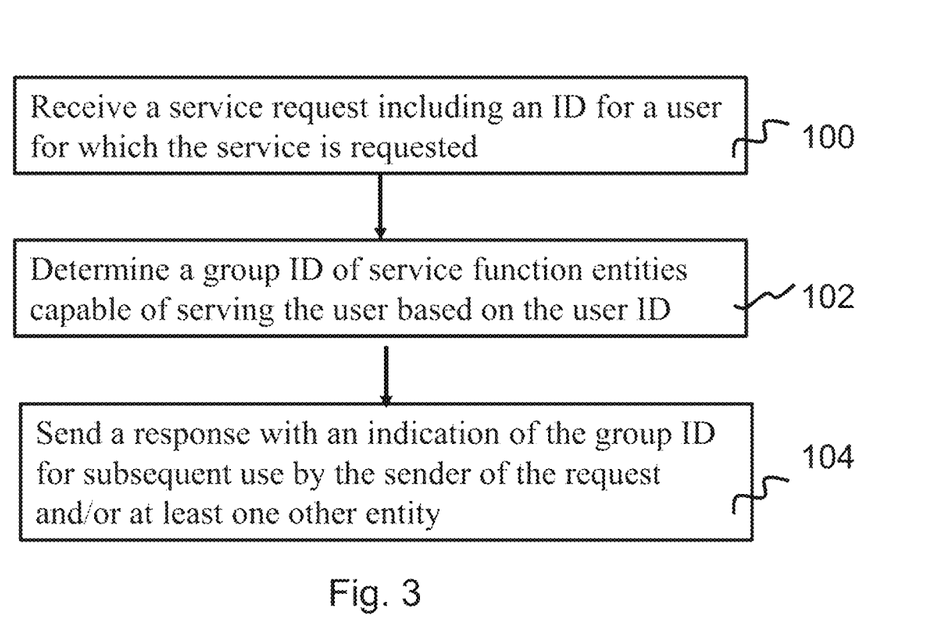
FIGS. 3 and 4 are flowcharts according to certain examples.

In accordance with an example shown in the flowchart of FIG. 3 an entity can be configured to determine a group identity for another entity and inform at least one further entity of the determined group identity. More particularly, a request for a service provided by a service function entity in a network system is received at 100. The request indicates an identity associated with a user for which the service is requested. For example, a user identity associated with the device 10 of FIG. 1 can be indicated. An identity of a group of service function entities capable of serving the user and determined based on the identity of the user is determined at 102. An indication of the determined identity of the group is provided at 104 in a response for subsequent use by the sender of the request and/or at least one other entity involved in requests for services associated with the user.

The request can be received indirectly from a device requesting and using the service. The request for the service may be received from a network function, for example an entity providing access and mobility management functions for accessing devices. The processing of the determining and service function entity selection can be delegated to a proxy function. For example, in FIG. 1 the group identity can be communicated from the proxy entity 12 in a response message to the access management function 11 and then to any of the core network entities 13 to 19. The group identity indication may be delivered to the entity providing access and mobility management functions and/or to the accessing device. The indication can be sent for storing of the determined group identity for subsequent use by a recipient of the indication.

The indication of the determined group identity can be included into a message that is a response to a service request. Sending of the indication of the determined group identity may comprise including the indication into a header of a message. The indication may be carried in a header comprising a 3GPP Service Based Architecture (SBA) compatible Service Based Interface (SBI) header. Examples for possible formats are given below.

Figure 4:
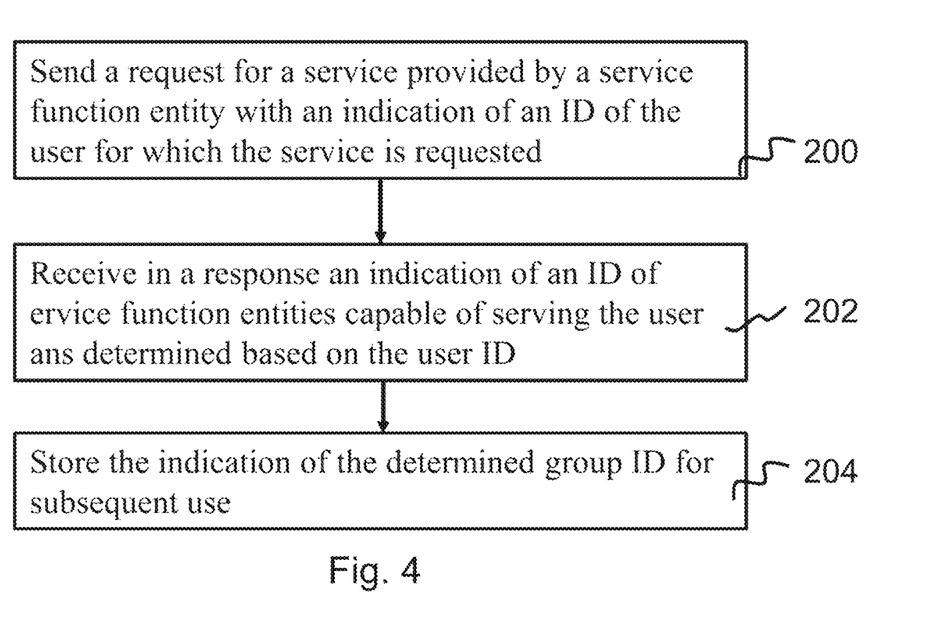

FIG. 4 illustrates another example where an entity receives the indication of a group identity determined subsequent to sending a request for a service to be provided for a user of the service. The entity receiving the indication may comprise, for example a network function entity. A more detailed example is an entity providing access and mobility management functions for accessing devices. At 200 a request is sent for a service provided by a service function entity in a network system, wherein the request indicates an identity of a user for which the service is requested. A response comprising an identity of a group of service function entities capable of serving the user and determined based on the indicated identity of the user is received at 202. The indication of the determined identity of the group is stored at 204 for subsequent use by the recipient of the response and/or at least one other entity involved in requests for services associated with the user.

The storing may be provided at least temporarily. For example, the group ID can be stored until the end of the service session or registration. More detailed examples for possible uses of the group ID in various scenarios are discussed below.

In certain applications the discovery can be delegated to a SCP. When the discovery is based on identity such as a SUPI of the accessing device an issue may arise because either the SCP or the NRF may first need to resolve the UDM group ID based on the SUPI and then discover the UDM for the corresponding UDM group ID. The user of the network function is not necessarily informed about the UDM group ID. Hence the user of the network function may not able to pass the UDM group ID to any other network function, should this be needed for whatever reason. To be able to do so the user of the network function needs to perform a separate NRF query to retrieve the UDM profile for the network function instance ID as specified in the 3gpp-Sbi-Producer-Id header.

Similar issues may also exist in other contexts than the UDM service such as, for example, AUSF discovery and HSS discovery. For example, during IMS registration when interrogation call state control function (I-CSCF) discovers HSS service using model D, the I-CSCF may not be aware of the HSS group ID that was resolved by the SCP or the NRF for the IMPI/IMPU, and the I-CSCF may not be able to pass the HSS group ID in session initiation protocol (SIP) signalling to serving call state control function (S-CSCF).

The following presents more detailed examples relating to an operation where a Service Communication Proxy (SCP) provides a group identity (ID) to devices using services provided by network functions. The devices may be using services such as the Unified Data Management (UDM) service, Home Subscriber Server (HSS) service and Authentication Server Function (AUSF) service. Further examples of include services such as Policy Control Function (PCF), Unified Data repository (UDR), and Charging Function (CHF).

The group identity information can be provided to service using entity by configuring a Service Based Interface (SBI) custom header to have format 3gpp-Sbi-Target-Nf-Group-Id. The SBI header can be modified to be applicable for all services which involve resolving the group identity based on user identity. The header can be provided in the service response.

The SCP can then use a header like 3gpp-Sbi-Target-Group-Id for indicating the group ID of the service producing network function (NF) to the user devices and other entities involved in the use of the service. For example, the SCP can use the header for indicating the group ID of the producer NF to the user of UDM, AUSF, HSS, PCF, CHF and UDR services in a service response message. In accordance with a possibility the recipient can store in a memory thereof the received group ID information for subsequent use. The group ID information can be stored for a configured duration. According to a possibility the group ID information has the same expiry as the UE context. The recipient can also pass the group ID information to at least one other network function according the service specific application programming interface (API) and/or appropriate signalling.

Figure 5:
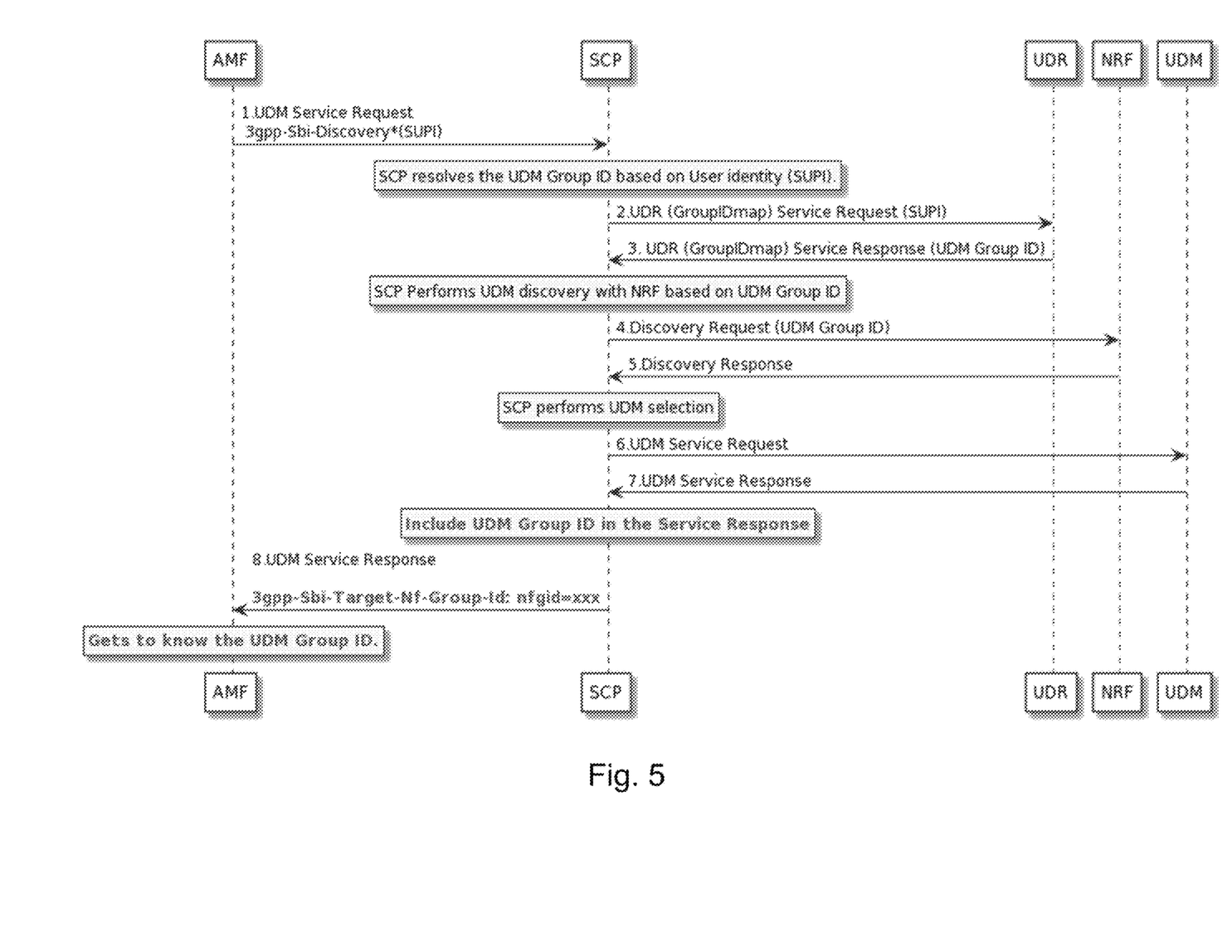
FIG. 5 is a signaling flow chart between according to one example.

An example will now be described in the context of user equipment registration procedure in accordance with 3GPP. In current registration procedure an active Access and Mobility Management Function (AMF) performs at separate steps required service selections, for example AUSF Selection, UDM Selection and PCF Selection and related operations, based on the user identity. The user identity can comprise, for example, a permanent subscriber identity (SUPI) of a user equipment (UE). The service discovery can be delegated to a SCP. That is, the task of performing selection of the service providing instances and necessary actions can be delegated to a SCP instance. An example of a possible signal flow for this is shown in FIG. 5 in the context of the SCP performing UDM selection. However, it is noted that similar procedure can be applied to other service requests.

In FIG. 5 the AMF sends in message 1 a UDM service request to the SCP. The request includes the user device identity, for example SUPI. The SCP then initiates the procure to resolve the UDM group ID based on the user identity. Message 2 is sent to an UDR requesting for UDR service. Message 2 includes the user identity and a specific request for group ID mapping. The UDR responds by message 3 including the UDM group ID resolved based on the user identity to the SCP. The SCP can now perform UDM discovery with an NRF based on the received UDM group ID. Message 4 comprising a discovery request and including the UDM group ID is sent to the NRF. NRF responds by message 5 to the discovery request. The SCP can now select the indicated UDM. The SCP sends in message 6 a UDM service request to the selected UDM and receives a service response in message 7 from the UDM.

The SCP is in the possession of the UDM group ID and therefore can provide it to the AMF by message 8. The AMF may then use the UDM group ID for communications with other entities. In accordance with an example of informing the AMF about the UDM group ID the SCP includes the UDM group ID in a HTTP 3GPP SBI header 3gpp-Sbi-Target-Nf-Group-Id. This header can be used in a service response from the SCP to the NF service consumer, when using indirect communication, to identify the NF group ID of the NF service producer.

Reception of the group ID information allows the AMF to signal the UDM group ID to other NFs, e.g. to the SMF (Nsmf_PDUSession_Create) when the UE establishes a PDU session, to the SMSF (Nsmsf_SMService_Activate) when Short Message Service (SMS) is enabled for the subscriber, or other AMF (Namf_Communication_UEContextTransfer) during inter-AMF mobility. Accordingly, when the SMF, the SMSF or a new AMF invoke UDM services (e.g., to register the SMF, SMF or new AMF in UDM), they can discover the UDM using the group ID (when not delegating the selection of the UDM to the SCP, using the NRF NFDiscovery group-id-list query parameter per clause 6.2.3.2.3.1 of 3GPP TS 29.510 v16.6.0). They can also include the 3gpp-Sbi-Discovery-group-id-list header in their service request to the SCP (when delegating the selection of the UDM to the SCP). In both cases, need to resolve first the UDM group ID from the SUPI can be avoided.

In above example the header is defined as 3gpp-Sbi-Target-Nf-Group-Id. This header can contain the UDM/HSS/AUSF/UDR/CHF/PCF group identity. The encoding of the header can follow the Augmented Backus-Naur Form (ABNF) as defined in IETF RFC 7230. Such header can have the form: 3gpp-Sbi-Target-Nf-Group-Id="3gpp-Sbi-Target-Nf-Group-Id" ":" OWS "nfgid=" nfGroupIdvalue (parameter nfgid indicate a NF group ID).

For example: 3gpp-Sbi-Target-Nf-Group-Id: nfgid="udm-group-15"

Another example of how the target NF group ID may be encoded in a service response to a device using a NF service is to extend the existing 3gpp-Sbi-Producer-Id header with a new nfGroupId parameter: 3gpp-Sbi-Producer-Id="3gpp-Sbi-Producer-Id" ":" OWS "nfinst=" nfInstanceIdvalue [;OWS "nfgid=" nfGroupIdvalue]. Such message would be, for example: 3gpp-Sbi-Producer-Id:nfinst=54804518-4191-46b3-955c-ac631f953ed8; nfgid="udm-group-15"

Such a header can be standardised to provide identity of the UDM, AUSF, HSS, PCF, CHF and UDR group identity to the service using device. For example, use of the header for model D and/or C discussed above can be standardized. This may require defining the new 3gpp-Sbi-Target-Nf-Group-Id header and ABNF syntax as described above and operations of the entities that need to handle the header.

In accordance with an example service producer's NF instance ID and NF group ID can be returned to the user of the NF service (service consumer). Indirect communication with delegated discovery can be provided. Another possibility is to provide indirect communication without delegated discovery when the NF service consumer only selects an NF set and delegates the selection of the NF service instance to the SCP. An SCP that (re)selected the target NF service instance can include the 3gpp-Sbi-Producer-Id header in its response. In addition, if the target NF service instance pertains to an NF Group, the 3gpp-Sbi-Target-Nf-Group-Id header can also be included in the HTTP response the SCP forwards towards the NF service consumer. The response can thus contain respectively the NF Instance ID and the NF Group ID of the NF Service Producer selected by the SCP.

If the 3gpp-Sbi-Producer-Id header or the 3gpp-Sbi-Target-Nf-Group-Id header is already present in an HTTP response (e.g. in scenarios with multiple SCPs between the NF service consumer and NF service producer), the SCP can forward the respective header unmodified in the response towards the HTTP client, without adding any new such header or other information.

This can be used to support deployments where not all NF service producers or NF service consumers have been upgraded to support binding procedures. In scenarios where the same NF service producer needs to be selected when creating new resources, e.g. when the AMF needs to establish a new PDU session towards the same SMF as the one selected for a previous PDU session, the NF service consumer can include a header like 3gpp-Sbi-Discovery-target-nf-instance-id set to the NF instance ID of the NF service producer in the request creating the new resource.

An SCP may not need to insert a 3gpp-Sbi-Producer-Id header nor a 3gpp-Sbi-Target-Nf-Group-Id header in an HTTP response if it has already received a 3gpp-Sbi-Target-apiRoot header in a related HTTP request and has not reselected a different NF service producer.

It is noted that while the above describes example embodiments, there are several variations and modifications which may be made to the disclosed solution without departing from the scope of the present invention. Different features from different embodiments may be combined.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. At least a part of the functions can be provided in virtualised environment, and at least some of the entities can be provided as virtual computing instances. Further in this regard it should be noted that any of the above procedures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples.

Alternatively or additionally some embodiments may be implemented using circuitry. The circuitry may be configured to perform one or more of the functions and/or method procedures previously described. That circuitry may be provided in the network entity and/or in the communications device and/or a server and/or a device.

As used in this application, the term "circuitry" may refer to one or more or all of the following:
 (a) hardware-only circuit implementations (such as implementations in only analogue and/or digital circuitry);
 (b) combinations of hardware circuits and software, such as:
  (i) a combination of analogue and/or digital hardware circuit(s) with software/firmware and
  (ii) any portions of hardware processor(s) with software (including digital signal processor(s)), software, and memory(ies) that work together to cause the communications device and/or device and/or server and/or network entity to perform the various functions previously described; and
 (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

Further examples for understanding the invention are described below:

Example 1. An apparatus comprising at least one processor and at least one memory including a computer program code, the at least one memory and computer program code configured to, with the at least one processor, cause the apparatus at least to: receive a request for a service provided by a service function entity in a network system, wherein the request indicates an identity of a user for which the service is requested; determine an identity of a group of service function entities capable of serving the user and determined based on the identity of the user; and send an indication of the determined identity of the group in the response for subsequent use by the sender of the request and/or at least one other entity involved in requests for services associated with the user.

Example 2. The apparatus according to Example 1, configured to receive the request for the service from a network function entity, send an enquiry to at least one network entity associated with providing the requested service, and send the indication of the determined identity of the group in a response to the network function entity.

Example 3. The apparatus according to Example 2, wherein the network function entity comprises an access and mobility management function.

Example 4. The apparatus according to any of Examples 1 to 3, comprising a service proxy function configured to determine and send the indication of the identity of the group in response to receiving the request.

Example 5. An apparatus comprising at least one processor and at least one memory including a computer program code, the at least one memory and computer program code configured to, with the at least one processor, cause the apparatus at least to: send a request for a service provided by a service function entity in a network system, wherein the request indicates an identity of a user for which the service is requested; receive in response an identity of a group of service function entities capable of serving the user and determined based on the indicated identity of the user; and store the indication of the determined identity of the group for subsequent use by the apparatus and/or at least one other entity involved in requests for services associated with the user.

Example 6. The apparatus according to Example 5, comprising one of a user device requesting for the service or a network access management entity receiving a request for the service from a user device.

Example 7. The apparatus according to any preceding Example, configured to communicate the indication of the determined identity of the group in a header of a service response message to the request for service.

Example 8. The apparatus according to Example 7, wherein the header comprises a header configured for use as a 3GPP Service Based Interface (SBI) header.

Example 9. The apparatus according to Example 8, wherein the header is configured as: 3gpp-Sbi-Target-Nf-Group-Id" ":" OWS "nfgid=" nfGroupIdvalue; or 3gpp-Sbi-Producer-Id="3gpp-Sbi-Producer-Id" ":" OWS "nfinst=" nfInstanceIdvalue [;OWS "nfgid=" nfGroupIdvalue], wherein nfgid indicates the network function and the determined identity of the group.

Example 10. The apparatus according to any preceding Example, wherein the request comprises a request for services to the user by a provider of at least one of Unified Data Management service, Authentication Server Function, Policy Control Function, Unified Data Repository, Charging Function, or Home Subscriber Service.

Example 11. The apparatus according to any preceding Example, wherein the identity of the group comprises group identity for at least one of Unified Data Management service, Authentication Server Function, Policy Control Function, Unified Data Repository, Charging Function, or Home Subscriber Service.

Example 12. The apparatus according to any preceding claim, wherein the service function entity is discovered and selected in the network system based on a mobile subscriber identity and exchange of messages with a Network Function Repository Function, and a request for the service is sent to the selected service function entity, and an indication of the identity of the group is included in a service response.

Example 13. A method comprising: receiving a request for a service provided by a service function entity in a network system, wherein the request indicates an identity of a user for which the service is requested; determining an identity of a group of service function entities capable of serving the user and determined based on the identity of the user; and sending an indication of the determined identity of the group in a response for subsequent use by the sender of the request and/or at least one other entity involved in requests for services associated with the user.

Example 14. The method according to Example 13, wherein the receiving comprises receiving the request for the service from a network function entity, the determining comprises sending an enquiry to at least one network entity associated with providing the requested service, and the sending of the indication comprises sending the determined identity of the group to the network function entity.

Example 15. A method comprising: sending a request for a service provided by a service function entity in a network system, wherein the request indicates an identity of a user for which the service is requested; receiving in response an identity of a group of service function entities capable of serving the user and determined based on the indicated identity of the user; and storing the indication of the determined identity of the group for subsequent use by the recipient of the response to the request and/or at least one other entity involved in requests for services associated with the user.

Example 16. The method according to any of Examples 13 or 15, comprising indirect communication with delegated service discovery.

Example 17. The method according to any of Examples 13 or 16, wherein the indication of the determined group identity is communicated in a header of a service response message.

Example 18. The method according to Example 17, wherein the header comprises a header configured for use as a 3GPP Service Based Interface (SBI) header.

Example 19. The method according to Example 18, wherein the header is configured to be one of: 3gpp-Sbi-Target-Nf-Group-Id" ":" OWS "nfgid=" nfGroupIdvalue; or 3gpp-Sbi-Producer-Id="3gpp-Sbi-Producer-Id" ":" OWS "nfinst=" nfInstanceIdvalue [;OWS "nfgid=" nfGroupIdvalue]; wherein nfgid indicates the network function and the determined identity of the group.

Example 20. The method according to any of Examples 13 to 19, wherein the request comprises a request for services to the user by a provider of at least one of Unified Data Management service, Authentication Server Function, Policy Control Function, Unified Data Repository, Charging Function, or Home Subscriber Service.

Example 21. The method according to any of Examples 13 to 20, comprising discovering and selecting a service function entity in the network system based on a mobile subscriber identity and exchange of messages with a Network Function Repository Function, sending a request for the service to the selected service function entity, and including an indication of the identity of the group in a service response.

Example 22. The method according to any of Examples 13 to 21, wherein a service communication proxy receives the request for the service and sends in a service response message the indication of the determined group identity.

Example 23. The method according to any of Examples 13 to 22, comprising determining a group identity for at least one of Unified Data Management service, Authentication Server Function, Policy Control Function, Unified Data Repository, Charging Function, or Home Subscriber Service.

Example 24. The method according to any of Examples 13 to 23, comprising storing the determined identity of the group for subsequent use and/or sending the indication of the determined identity of the group for subsequent use by a recipient of the indication.

Example 25. The method according to any of Examples 13 to 24, comprising communication of the indication of the determined identity of the group for use by a device using the requested service.

Example 26. A computer readable media comprising program code for causing a processor to perform instructions for a method as claimed in any of Example 13 to 25.

It is noted that whilst embodiments have been described in relation to certain architectures, similar principles can be applied to other systems. Therefore, although certain embodiments were described above by way of example with reference to certain exemplifying architectures for wireless networks, technologies standards, and protocols, the herein described features may be applied to any other suitable forms of systems, architectures and devices than those illustrated and described in detail in the above examples. It is also noted that different combinations of different embodiments are possible. It is also noted herein that while the above describes exemplifying embodiments, there are several variations and modifications which may be made to the disclosed solution without departing from the spirit and scope of the present invention.

We claim:

1. A service proxy apparatus, comprising:
at least one processor, and
at least one memory including a computer program code which, when executed by the at least one processor, causes the service proxy apparatus at least to perform:
receiving, from a network entity, a request for a service provided by a service function entity in a network system, wherein the request indicates an identity of a user device for which the service is requested,
determining, based on the identity of the user device indicated by the request, an identity of a group of service functions configured to provide the service to the user device, and
sending, to the network entity, in a header of a service response message to the request for service, an indication of the identity of the group of service functions for subsequent use by at least one of a sender of the request or at least one other entity involved in requests for service associated with the user device, wherein the header comprises a header configured for use as a 3rd Generation Partnership Project (3GPP) Service Based Interface (SBI) header, and wherein the header is configured as 3gpp-Sbi-Target-Nf-Group-Id" ":" OWS "nfgid=" nfGroupIdvalue, and nfgid indicates the identity of the group of service functions.

2. The service proxy apparatus according to claim 1, wherein the computer program code is further configured, when executed by the at least one processor, to cause the apparatus to perform:
sending an enquiry to at least one network entity associated with providing the service of the request.

3. The service proxy apparatus according to claim 1, wherein the service provided by the service function entity comprises at least one of the following: a service provided by a Unified Data Management, a service provided by an Authentication Server Function, a service provided by a Policy Control Function, a service provided by a Unified Data Repository, a service provided by a Charging Function, or a service provided by a Home Subscriber Service.

4. The service proxy apparatus according to claim 1, wherein the identity of the group of service functions comprises group identity for a group of at least one of the following: Unified Data Management, Authentication Server Function, Policy Control Function, Unified Data Repository, Charging Function, or Home Subscriber Service.

5. The service proxy apparatus according to claim 1, wherein the computer program code is further configured, when executed by the at least one processor, to cause the apparatus to perform a discovery procedure comprising:

sending, to a Network Repository Function, a discovery request comprising the identity of the group of service functions; and
receiving, from the Network Repository Function, a discovery response message indicating the service function entity that is discovered based on the identity of the group of service functions.

6. A method of a service communication proxy, the method comprising:
receiving, from a network entity, a request for a service provided by a service function entity in a network system, wherein the request indicates an identity of a user device for which the service is requested,
determining, based on the identity of the user device, an identity of a group of service functions configured to provide the service to the user device, and
sending, to the network entity, in a header of a service response message to the request for service, an indication of the identity of the group of service functions for subsequent use by at least one of a sender of the request or at least one other entity involved in requests for service associated with the user device, wherein the header comprises a header configured for use as a 3rd Generation Partnership Project (3GPP) Service Based Interface (SBI) header, and wherein the header is configured as 3gpp-Sbi-Target-Nf-Group-Id" ":" OWS "nfgid=" nfGroupIdvalue, and nfgid indicates the identity of the group of service functions.

7. The method according to claim 6, wherein:
the determining comprises sending an enquiry to at least one network entity associated with providing the service of the request.

8. The method according to claim 6, wherein the service provided by the service function entity comprises at least one of the following: a service provided by a Unified Data Management, a service provided by an Authentication Server Function, a service provided by a Policy Control Function, a service provided by a Unified Data Repository, a service provided by a Charging Function, or a service provided by a Home Subscriber Service.

9. The method according to claim 6, wherein the identity of the group of service functions comprises group identity for a group of at least one of the following: Unified Data Management, Authentication Server Function, Policy Control Function, Unified Data Repository, Charging Function, or Home Subscriber Service.

10. The method according to claim 6, further comprising performing a discovery procedure comprising:
sending, to a Network Repository Function, a discovery request comprising the identity of the group of service functions; and
receiving, from the Network Repository Function, a discovery response message indicating the service function entity that is discovered based on the identity of the group of service functions.

11. A non-transitory computer readable storage medium comprising computer executable instructions, which when executed by a computer, cause the computer to perform:
receiving, from a network entity, a request for a service provided by a service function entity in a network system, wherein the request indicates an identity of a user device for which the service is requested,
determining, based on the identity of the user device, an identity of a group of service functions configured to provide the service to the user device, and
sending, to the network entity, in a header of a service response message to the request for service, an indication of the identity of the group of service functions for subsequent use by at least one of a sender of the request or at least one other entity involved in requests for service associated with the user device, wherein the header comprises a header configured for use as a 3rd Generation Partnership Project (3GPP) Service Based Interface (SBI) header, and wherein the header is configured as 3gpp-Sbi-Target-Nf-Group-Id" ":" OWS "nfgid=" nfGroupIdvalue, and nfgid indicates the identity of the group of service functions.

12. The non-transitory computer readable storage medium according to claim 11, wherein the determining comprises sending an enquiry to at least one network entity associated with providing the service of the request.

13. The non-transitory computer readable storage medium according to claim 11, wherein the service provided by the service function entity comprises at least one of the following: a service provided by a Unified Data Management, a service provided by an Authentication Server Function, a service provided by a Policy Control Function, a service provided by a Unified Data Repository, a service provided by a Charging Function, or a service provided by a Home Subscriber Service.

14. The non-transitory computer readable storage medium according to claim 11, wherein the identity of the group of service functions comprises group identity for a group of at least one of the following: Unified Data Management, Authentication Server Function, Policy Control Function, Unified Data Repository, Charging Function, or Home Subscriber Service.

* * * * *